(12) United States Patent
Merchant et al.

(10) Patent No.: US 11,550,712 B2
(45) Date of Patent: Jan. 10, 2023

(54) OPTIMIZING GARBAGE COLLECTION BASED ON SURVIVOR LIFETIME PREDICTION

(71) Applicant: Google LLC, Mountain View, CA (US)

(72) Inventors: Arif Merchant, Los Altos, CA (US); Lluis Pamies-Juarez, San Jose, CA (US)

(73) Assignee: Google LLC, Mountain View, CA (US)

(*) Notice: Subject to any disclaimer, the term of this patent is extended or adjusted under 35 U.S.C. 154(b) by 203 days.

(21) Appl. No.: 16/899,147

(22) Filed: Jun. 11, 2020

(65) Prior Publication Data

US 2021/0390045 A1 Dec. 16, 2021

(51) Int. Cl.

| | |
|---|---|
| *G06F 12/02* | (2006.01) |
| *G06F 9/451* | (2018.01) |
| *G06N 20/00* | (2019.01) |
| *G06F 9/48* | (2006.01) |
| *G06F 9/54* | (2006.01) |
| *G06N 7/00* | (2006.01) |

(52) U.S. Cl.
CPC .......... *G06F 12/0253* (2013.01); *G06F 9/451* (2018.02); *G06F 9/4881* (2013.01); *G06F 9/542* (2013.01); *G06F 12/0246* (2013.01); *G06N 7/005* (2013.01); *G06N 20/00* (2019.01)

(58) Field of Classification Search
CPC .... G06F 12/0253; G06F 9/451; G06F 9/4881; G06F 9/542; G06F 12/0246; G06F 2206/1008; G06F 3/0608; G06F 3/0643; G06F 3/0679; G06F 16/125; G06F 16/162; G06F 2212/7205; G06F 3/0652; G06F 3/0676; G06N 7/005; G06N 20/00
See application file for complete search history.

(56) References Cited

U.S. PATENT DOCUMENTS

| | | | |
|---|---|---|---|
| 7,584,232 B2 | 9/2009 | Guo | |
| 8,447,918 B2 | 5/2013 | Sprinkle et al. | |
| 9,460,389 B1* | 10/2016 | Botelho | .............. G06F 12/0253 |
| 9,646,067 B2 | 5/2017 | Abercrombie et al. | |
| 10,572,184 B2 | 2/2020 | Hutchison et al. | |
| 2007/0022149 A1 | 1/2007 | Bacon et al. | |
| 2014/0181370 A1* | 6/2014 | Cohen | ................. G06F 12/0246 |
| | | | 711/103 |

(Continued)

FOREIGN PATENT DOCUMENTS

EP   3644189 A1   4/2020

OTHER PUBLICATIONS

Hajime Inoue, Darko Stefanovi'c, and Stephanie Forrest, On the Prediction of Java Object Lifetimes, IEEE Transactions on Computers, vol. 0, No. 0, Month 2003, 32 pages.

(Continued)

*Primary Examiner* — Tasnima Matin
(74) *Attorney, Agent, or Firm* — Lerner, David, Littenberg, Krumholz & Mentlik, LLP (57) ABSTRACT

A predictive method for scheduling of the operations is described. The predictive method utilizes data generated from computing an expected lifetime of the individual files or objects within the container. The expected lifetime of individual files or objects can be generated based on machine learning techniques. Operations such as garbage collection are scheduled at an epoch where computational efficiencies are realized for performing the operation.

20 Claims, 8 Drawing Sheets

Method 400

(56) References Cited

U.S. PATENT DOCUMENTS

2018/0322040 A1* 11/2018 Nikoloudakis ....... G06F 3/0652
2019/0129834 A1* 5/2019 Purkayastha ....... G06F 12/0246
2020/0133845 A1* 4/2020 Kim ..................... G06F 12/121

OTHER PUBLICATIONS

Junghee Lee, Youngjae Kim, Galen M. Shipman, Sarp Oral, and Jongman Kim, Preemptible I/O Scheduling of Garbage Collection for Solid State Drives, IEEE Transactions on Computer-Aided Design of Integrated Circuits and Systems, vol. 32, No. 2, Feb. 2013, 14 pages.

Richard Jones and Chris Ryder, Garbage Collection Should Be Lifetime Aware, Jan. 2006, 8 pages.

Extended European Search Report for European Patent Application No. 20210997.1 dated May 26, 2021. 8 pages.

* cited by examiner

Method 400

OPTIMIZING GARBAGE COLLECTION BASED ON SURVIVOR LIFETIME PREDICTION

BACKGROUND

There exist many storage systems for storing electronic data where objects, which are relatively smaller in size, are aggregated into larger collections of data. For example, some file systems may be configured to operate on a larger collection of data rather than the individual objects which make up the larger collection of data. Some examples of such file formats or file systems include archives such as ".zip" or ".rar" files.

In other cases, the physical format or medium of storing data causes objects or files, or operations to be performed on files, to be treated as a collection rather than individually. For example, in shingled magnetic recording (SMR) disks, information can be stored into "zones." Although such technology can increase the storage density onto a physical medium, when data needs to be altered—such as when an individual object or file is removed or altered—the entire zone must be entirely rewritten. Thus, individual files stored onto a zone of an SMR cannot be altered without the entire track being modified. This leads to certain operations performed on these mediums to be more financially and computationally expensive as compared to the same operations performed on other storage mediums.

Garbage collection is a process in which a "garbage collector" or a "collector" attempts to reclaim "garbage." A "collector" or "garbage collector" can be an operation or piece of software which can remove unwanted or unneeded files, data, or objects. "Garbage" can refer to files, data, or objects which are no longer needed and can be removed from a collection. Some garbage collectors may be able to delete individual files or data when needed. In other examples, garbage collectors, a garbage collection can read, write, or interact with a fraction of an entire collection. However, in some examples, when a collector is dealing with files and storage media such as those described above, the garbage collector would need to read, write, or interact with the entire collection of data within which a file which is to be collected is stored. Further, it may not be known which files, data, or objects from the collection of data need to be analyzed or deleted before performing the garbage collection. Doing so requires the entire collection of data to be read and processed, which is a relatively expensive operation. Further, even after such processing or analysis, only a few or relatively small percentage of files or amount of data stored in the collection may be garbage.

The file systems and storage medium described above are prevalent in commercial data centers. For example, the use of SMR disks is becoming more ubiquitous and the size of tracks on these disks is increasing. As the entire zone of an SMR disk must be operated upon to delete a file which is garbage, the computational and operational cost of performing garbage collection is higher. Thus, the overall costs associated with maintaining data are increasing as data centers switch to higher density mediums such as SMR disks.

SUMMARY

The present disclosure provides methods, systems, and apparatuses for optimizing garbage collection based on survivor lifetime prediction.

One aspect of the present disclosure provides determining whether to perform a garbage collection operation including, identifying a container wherein the container comprises one or more discrete objects, determining a deletion predictor related to the container at a first epoch, computing a cost of garbage collection for the container at the first epoch, estimating a benefit for performing garbage collection at the first epoch, determining a net benefit of performing garbage collection for the container at the first epoch based on the computed cost and the estimated benefit.

Additional aspects of the present disclosure provide determining whether to perform a garbage collection operation including, identifying a container wherein the container comprises one or more discrete objects, determining a deletion predictor related to the container at a first epoch, computing a cost of garbage collection for the container at the first epoch, estimating a benefit for performing garbage collection at the first epoch, determining a net benefit of performing garbage collection for the container at the first epoch based on the computed cost and the estimated benefit. The deletion predictor can be determined using a machine learning classification algorithm which generates a binary deletion predictor. The machine learning algorithm can be a neural network. A user notification can be generated regarding the garbage collection. The notification can include a user request to approve a garbage collection. The notification can include information related to a schedule of garbage collection. The notification can include information indicating the expected benefit of the garbage collection. Scheduling of a garbage collection can occur at the first epoch at which the net benefit is positive. The deletion predictor related to the container can be determined for a pre-determined number of epochs following the first epoch. A net benefit for the container can be calculated at each epoch for the pre-determined number of epochs following the first epoch. The epoch at which the net benefit is the greatest can be identified and garbage collection can be scheduled for the epoch at which the net benefit is the greatest. Garbage collection can be scheduled at the earliest epoch from the pre-determined number of next epochs where the net benefit is above a pre-determined threshold. An additional net benefit can be generated for an additional epoch when close to a pre-determined range of the earliest epoch following the first epoch. Metrics related to the container can be re-evaluated upon occurrence of a trigger event. The trigger event can be the addition of data in the selected container. The trigger event can be a user command to perform a garbage collection on the selected container. Metrics related to the container can be re-evaluated at the start of any epoch which follows or is after, in time, the first epoch.

Additional aspects of this disclosure provide a system, the system configured to schedule garbage collection, including one or more non-volatile storage medium wherein each non-volatile storage medium contains one or more containers of data, each sector comprising one or more discrete objects, a non-transitory computer readable medium containing instructions, the instructions when executed configured to perform the steps of identifying a container, determining a deletion predictor related to the container in a first epoch, computing a cost of garbage collection for the container in the first epoch, estimating a benefit for performing garbage collection at the first epoch based on at least the determined deletion predictors related to the container, and determining a net benefit of performing garbage collection for the container at the first epoch based on the computed cost and the estimated benefit.

Additional aspects of this disclosure provide a non-transitory computer readable medium containing instructions, the instructions when executed configured to perform the steps of identifying a container, determining a deletion predictor related to the container for each discrete object in a first epoch, computing a cost of garbage collection for the container in the first epoch, estimating a benefit for performing garbage collection at the first epoch based on at least the determined deletion predictor related to the container, determining a net benefit of performing garbage collection for the container at the first epoch based on the computed cost and the estimated benefit.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

This disclosure generally relates to methods, systems, and apparatuses for optimizing garbage collection based on survivor lifetime prediction.

As used within this disclosure, a "container" of data can refer to a physical or file system view of a collection of data, which can be made of more than one or a collection of objects, files, bits, unstructured data, or other containers. Certain types of file formats, file systems, and storage medium view data as a unit rather than as the individual files or objects making up the particular collection. In some examples, a container can be a ".zip" file, a ".rar" file, an ".iso" or other "file" which contains additional files or objects within it. A container can also contain metadata which can reference the various files contained within the container. In some examples, this metadata can also be independently stored in a second location to cross-reference, provide a check, or otherwise provide a robust back-up in case the metadata stored within the container is lost, corrupted, or deleted. In other examples, an entire operating system image can be container, which as explained above, can contain additional containers. In some examples, a virtual machine image (a VMI) or a storage portion of a virtual machine can be a container, which contains more than one type of container, such as, additional virtual machine images, .rar, .iso, or other collections of files or objects. In some examples, a container can be a file or a set of files. In some examples, the container can be stored in one location or distributed across multiple locations. In some examples, a portion of a container can be distributed across multiple locations, wherein at any of the location, portions of the containers can be stored on any storage media, such as without limitation, a tape, optical storage, volatile memory, or some other storage medium.

In some examples, a container can be a physical sector of a storage medium. For example, shingled magnetic recording (SMR) is a type of magnetic storage technology which uses zones, which are groups of contiguous magnetic tracks. Each zone can be a container. In yet other examples, an entire part of a hard drive or non-volatile memory can be a container.

The process of garbage collection can be thought to be performed at discrete fixed intervals of time. As further explained below, in some examples, garbage collection can be performed at dynamical time intervals. These periods of time can be considered to be epochs at which garbage collection can occur. Epochs can be points of time, intervals with non-epoch time separating the epochs, or intervals with no time separating the epochs.

Figure 1:
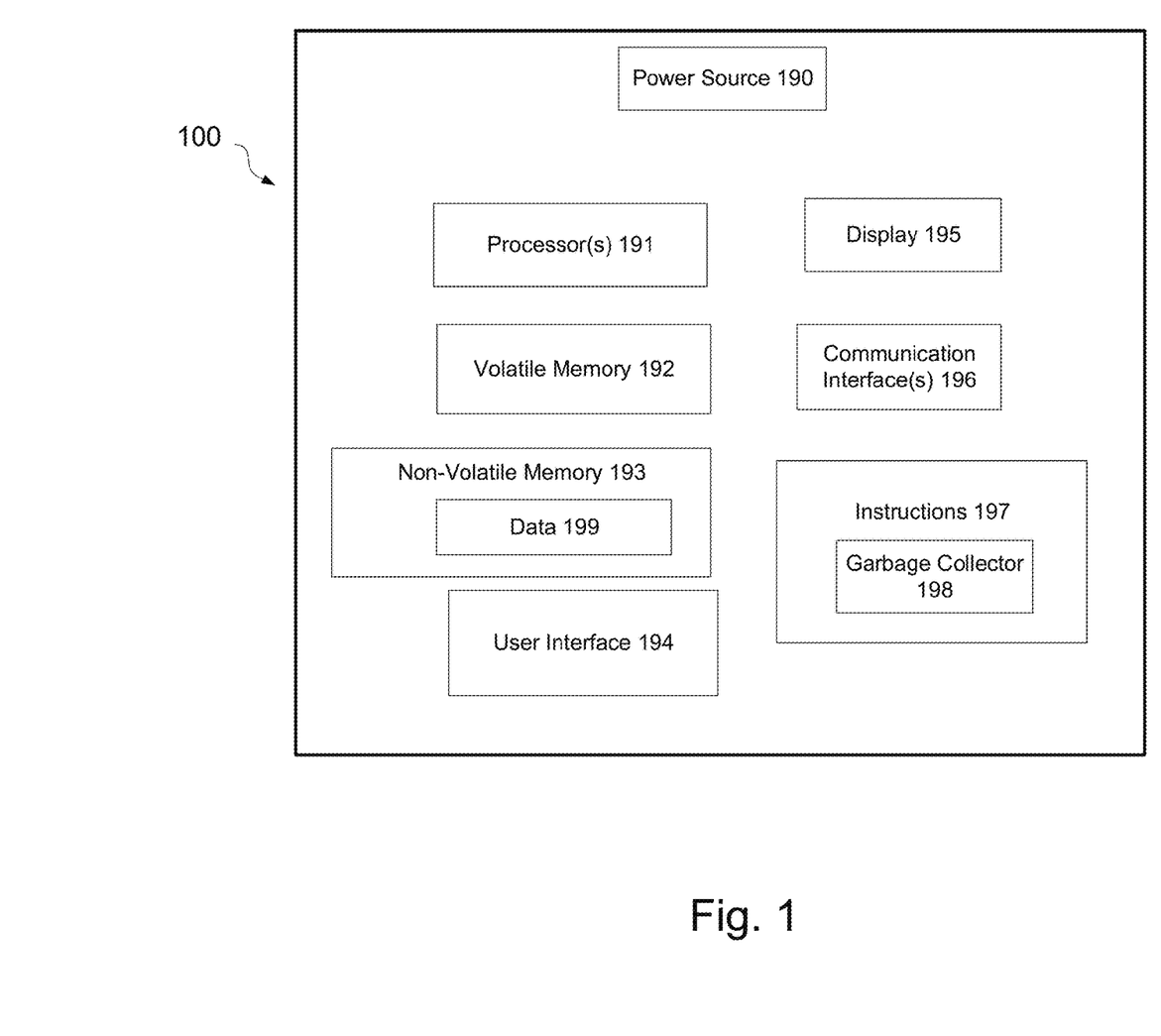
FIG. 1 is a diagram of a computer system according to aspects of this disclosure.

FIG. 1 illustrates aspects of a computing device 100. Computing device 100 can be any type of computing device such as a server, cluster of servers, virtual machine, a personal computing device, distributed storage network, laptop, desktop, mobile device, or custom-designed hardware device. Computing device 100 may contain a processor(s) 191, volatile memory 192, non-volatile memory 193, a user interface 194, a display 195, communication interface(s) 196, instructions 197, a garbage collector 198, and data 199.

Computing device 100 may include a garbage collector 198 configured to identify objects in the non-volatile memory 193 that can be removed. Garbage collector 100 can be a separate program or a set of instructions. The garbage collector 198 in the device 100 may be configured to search non-volatile memory 193, search a portion of the non-volatile memory, such as a container, or search non-volatile memory which is external to or otherwise not physically stored in computing device 100. Garbage collector 198 can also store a schedule of when to conduct garbage collections on one or more containers in data 199.

Although illustrated as part of instructions 197, the garbage collector may be a separate module or even be stored external to computing device 100. Garbage collector 198 may be a module of code executable by the processor 191, or in some examples it may be a separate unit with a dedicated processor. Garbage collector 198 may operate in epochs, cycles of fixed time, or cycles of non-fixed time. As performing garbage collection is a computationally complex and data intensive operation, determining at which epoch to perform garbage collection can be critical for properly maintaining a computing device, a server, or a non-volatile memory 193. For example, performing garbage collection at the next epoch, or several epochs from the current time may be more efficient than performing garbage collection at the upcoming epoch. Additional details and examples are discussed below with reference to FIG. 4 below.

Processor(s) 191 may be any conventional processors, such as commercially available microprocessors, central processing unit, or application-specific integrated circuits (ASICs). Non-volatile memory 193 may store information that is accessible by processor(s) 191, including instructions that may be executed by the processors 191, and data. Although shown separately, volatile memory 192 may also store or load information to carry out instructions which are being executed by the processors 191. In some examples, as further explained with reference to the methods described below, the processors can be configured or designed for specific types of machine learning algorithms. In other examples, other types of computational units can make up processor(s) 191. For example, other computational units such as quantum computers or quantum bits can be used as part of processor(s) 191.

Volatile memory 192 may be any type of memory whose contents are not persistent or erased when not actively powered. For example, random access memory ("RAM") is a type of volatile memory. In some examples, the volatile memory can be included as part of processor(s) 191. In other examples, the volatile memory 192 can be distributed across computing device 100.

Non-volatile memory 193 may be of a type of memory operative to store information accessible by the processors, including a non-transitory computer-readable medium, or other medium that stores data that may be read with the aid of an electronic device, such as a hard-drive, memory card, read-only memory ("ROM"), optical disks, shingled magnetic recording, flash memory, as well as other write-capable and read-only memories. The subject matter disclosed herein may include different combinations of the foregoing, whereby different portions of the instructions and data are stored on different types of media. Non-volatile memory 193 may be distributed across one or more servers.

As further explained with reference to FIG. 2, non-volatile memory 193 can contain various files and/or containers of data. Non-volatile memory 193 can store data 199. Data 199 may be retrieved, stored or modified by the processors in accordance with the instructions 197. Data 199 may be made of one or more containers. For instance, although the present disclosure is not limited by a particular data structure, data 199 may be stored in computer registers, in a relational database as a table having a plurality of different fields and records, XML documents, or flat files. Data 199 may also be formatted in a computer-readable format such as, but not limited to, binary values, ASCII or Unicode. Moreover, data 199 may comprise information sufficient to identify the relevant information, such as numbers, descriptive text, proprietary codes, pointers, references to data stored in other memories including other network locations, or information that is used by a function to calculate the relevant data. In some examples, data 199 can contain containers stored in a storage server by a user. In some examples, multiple files from one user or a plurality of users can be queued to be stored or stored in one container within data 199 of non-volatile memory 193. In some examples, files can reside in a volatile memory before being moved and stored to containers within non-volatile memory 193.

User interface 194 may be a screen which allows a user to interact with computing device 100, such as a touch screen or buttons. Display 195 can be an LCD, LED, mobile phone display, electronic ink, or other display to display information about device 100. User interface 194 can allow for both input from a user and output to a user. Communication interface(s) 197 can include hardware and software to enable communication of data over standards such as Wi-Fi, Bluetooth, infrared, Ethernet, radio-wave, and/or other analog and digital communication standards. Communication interface(s) 197 allow for computing device 100 to be updated and information generated by computing device 100 to be shared to other computing devices, such as user devices, servers, or other electronic devices. In some examples, communication interface(s) 197 can send historical information or meta-data stored in non-volatile memory 193 or volatile memory 192 to another user device for display, storage, or further analysis. In other examples, communication interface(s) 197 can send and receive instructions in real time from other devices. In some examples, a computing device, such as computing device 100, can also receive input from a user, such as a confirmation on whether or not to perform a garbage collection, or receive instructions to perform an unscheduled garbage collection. Instructions 197 may control various components and functions of device 100. For example, instructions 197 may be executed to selectively determine when to perform garbage collection. Instruction 197 may also include additional algorithms to determine and/or calculate information about data 199, as further described below. In some examples, instructions 197 can determine high-level operations to be performed on non-volatile memory 193, such as deletion, moving, or copying data. In some other examples, artificial learning or machine learning algorithms can be used in both deterministic and non-deterministic ways to extract information related to when garbage collection is to be performed. Additional information regarding instructions 197 and/or algorithms is provided below with reference to FIG. 6.

Figure 2:
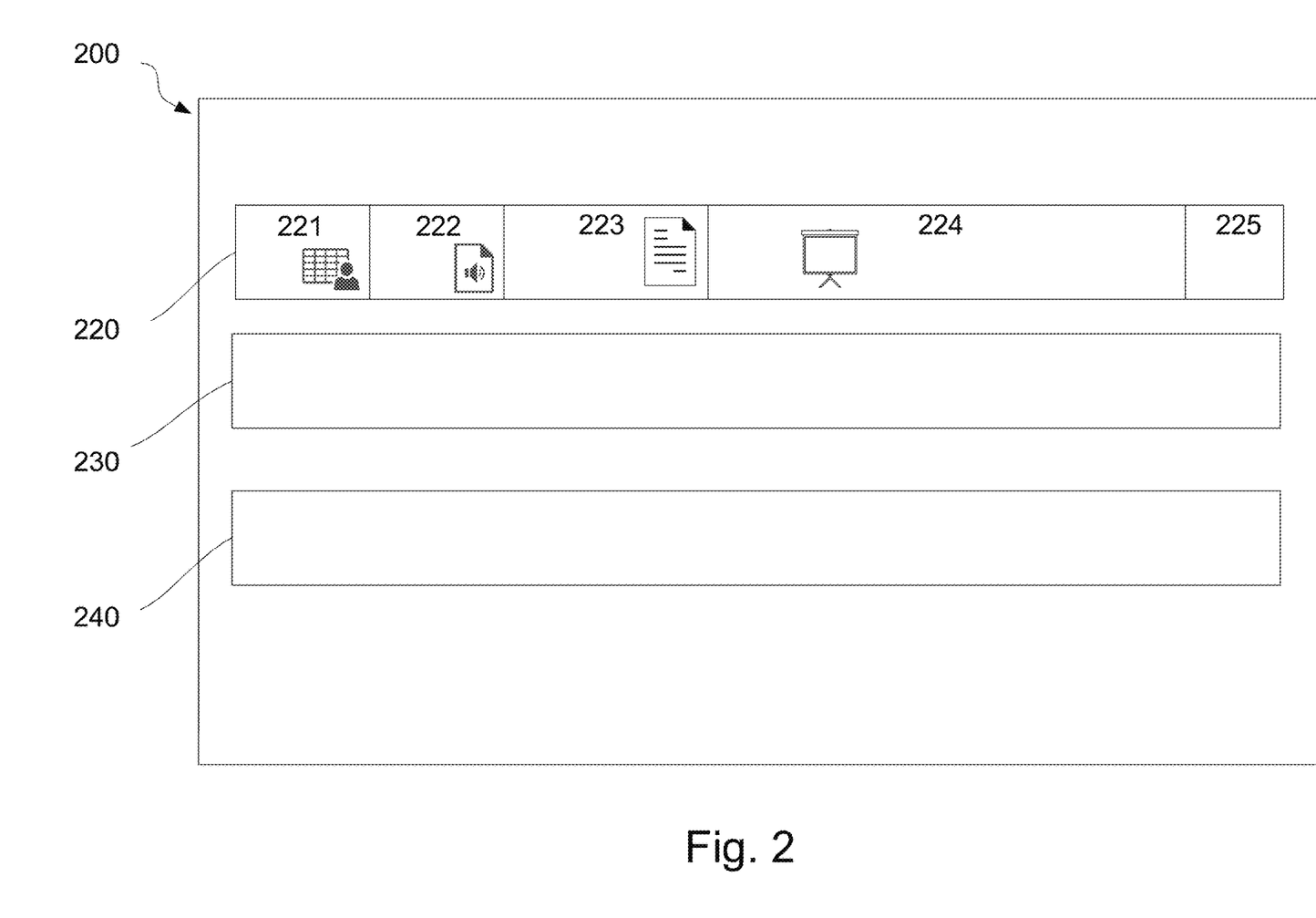
FIG. 2 is a diagram of a non-volatile storage medium according to aspects of this disclosure.

FIG. 2 illustrates a block diagram of a non-volatile memory 200. Non-volatile memory 200 can be similar to non-volatile memory 193 described above. Non-volatile memory 200 can be included in computing device 100. Non-volatile memory 200 can contain containers, such as containers 220, 230, and 240, which reside within the non-volatile memory 193. In some examples, each container can correspond with a physical division or component of memory. For example, containers 220-240 can each correspond to a track in a shingled magnetic recording respectively. In other examples, each container can correspond to a single section of flash memory such as a flash block. In such examples, reading, modifying, or performing data operations on the table is equivalent to performing operations on the entire physical portion corresponding to or in which the container is stored.

Container 220 can consist of one or more objects or files, such as files 221-224. Although only four files are illustrated here for simplicity, it is to be understood that one container can have any countably finite number of files, objects, or pieces of data, or even other containers. Container 220 can also contain a portion dedicated to storing metadata, such as metadata 225. Metadata 225 can contain information corresponding to the particular files stored within a container of information. Although not illustrated in FIG. 2, containers 230 and 240 can similarly contain objects, files, or data.

Each file, such as file 221 to 224 can be part of data which is stored and used in the system. Metadata 225, or other metadata stored elsewhere, can keep track of how or when the files within container 220 have been accessed, created, used, moved, or updated. Metadata 225 can also contain additional information about the properties, size, location, or type of file. In other examples, references to a file from other locations can be monitored or stored in metadata 225. Metadata 225 can include any combination of additional properties or pieces of information, such as without limitation, user owner, user location, user-provided tags, user-logical namespace such as the bucket name or folder, access control lists, permissions, encryption method, encryption key, compressions method, compressed size, and uncompressed size. In some examples, particular files can be considered to be "garbage" when the file meets one or more pre-determined conditions. For example, a file which has not been accessed for a fixed number of days and currently has no references to it can be considered to be garbage. Garbage collection can then be performed, for example, when a particular container reaches a certain fraction of that container being garbage. However, this process is based on heuristics and is limited as it (i) may not accurately determine when garbage collection should be done, (ii) does not take into consideration either the computational, data transfer, network, or other costs associated with conducting the garbage collection, nor (iii) the benefit from conducting the garbage collection. While these heuristics are useful, they do not take into account the predictive information derivable or related to the future behavior of the data of the containers or the container itself as described in this disclosure.

Figure 3A:
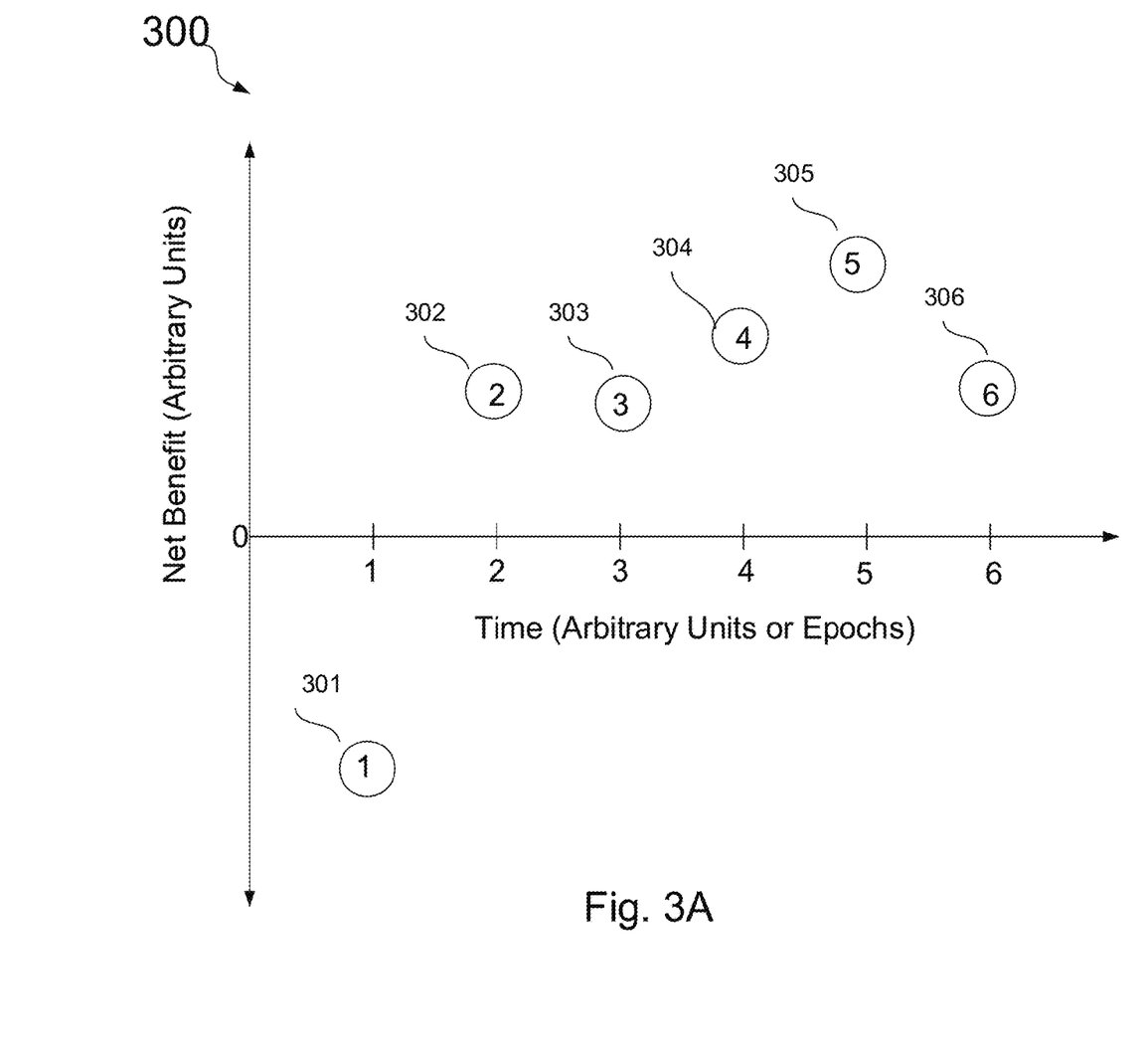
FIGS. 3A-3C are example graphs illustrating computed net benefits over a series of epochs according to aspects of this disclosure.

FIG. 3A illustrates an example representation, graph 300, of various epochs at which garbage collection can be performed. Graph 300 illustrates various epochs on the x-axis, as dashes with dashes and corresponding to the numbers 1, 2, 3, 4, 5, and 6 to represent six epochs. Each epoch can also correspond to a value, such as values 301-306. Each epoch can be a time at which garbage collection can be performed. A calculated or estimated net benefit, which is a difference between the benefit derived of performing garbage collection at a particular epoch and the cost associated with performing the garbage collection, is indicated on the vertical axis. At some epochs, such as at epoch 301, the net benefit can be negative. Although the net benefit is shown at specific epochs, a person of skill in the art would understand that garbage collection can occur at times between epochs. For example, garbage collection can be performed in response to an external system or signal indicating that garbage collection must occur, at for example, an arbitrary time. In other examples, an external signal can indicate that it is desired that a particular file needs to be deleted, and garbage collection is conducted at an optimal time.

Figure 3B:
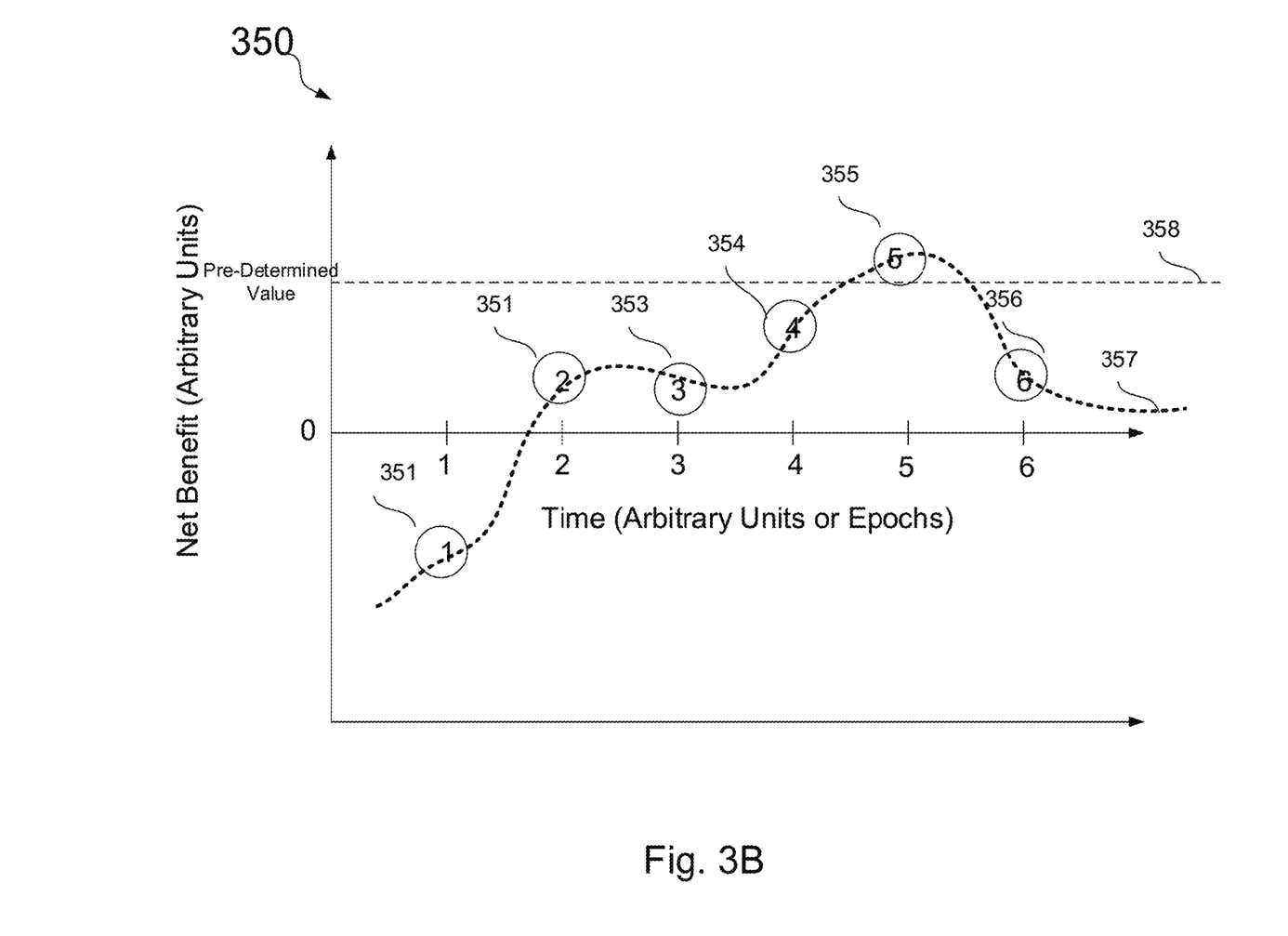

FIG. 3B illustrates a representation of various epochs at which garbage collection can be performed, graph 350, with values 351-356. Also illustrated in a dotted line is line 357. Line 357 can be a fitted function, extrapolation, or continuous, or dense discrete function which illustrates a relationship between time and net benefit between the epochs. Also illustrated in FIG. 3B is an unlabeled dotted line, line 358, corresponding to a "pre-determined value." As explained further below, this can be a set value above which garbage collection can be scheduled automatically for that epoch. In some examples, garbage collection can occur at a time which does not correspond to an epoch once this value is reached. In some examples, garbage collection can occur at non-fixed time intervals.

Figure 3C:
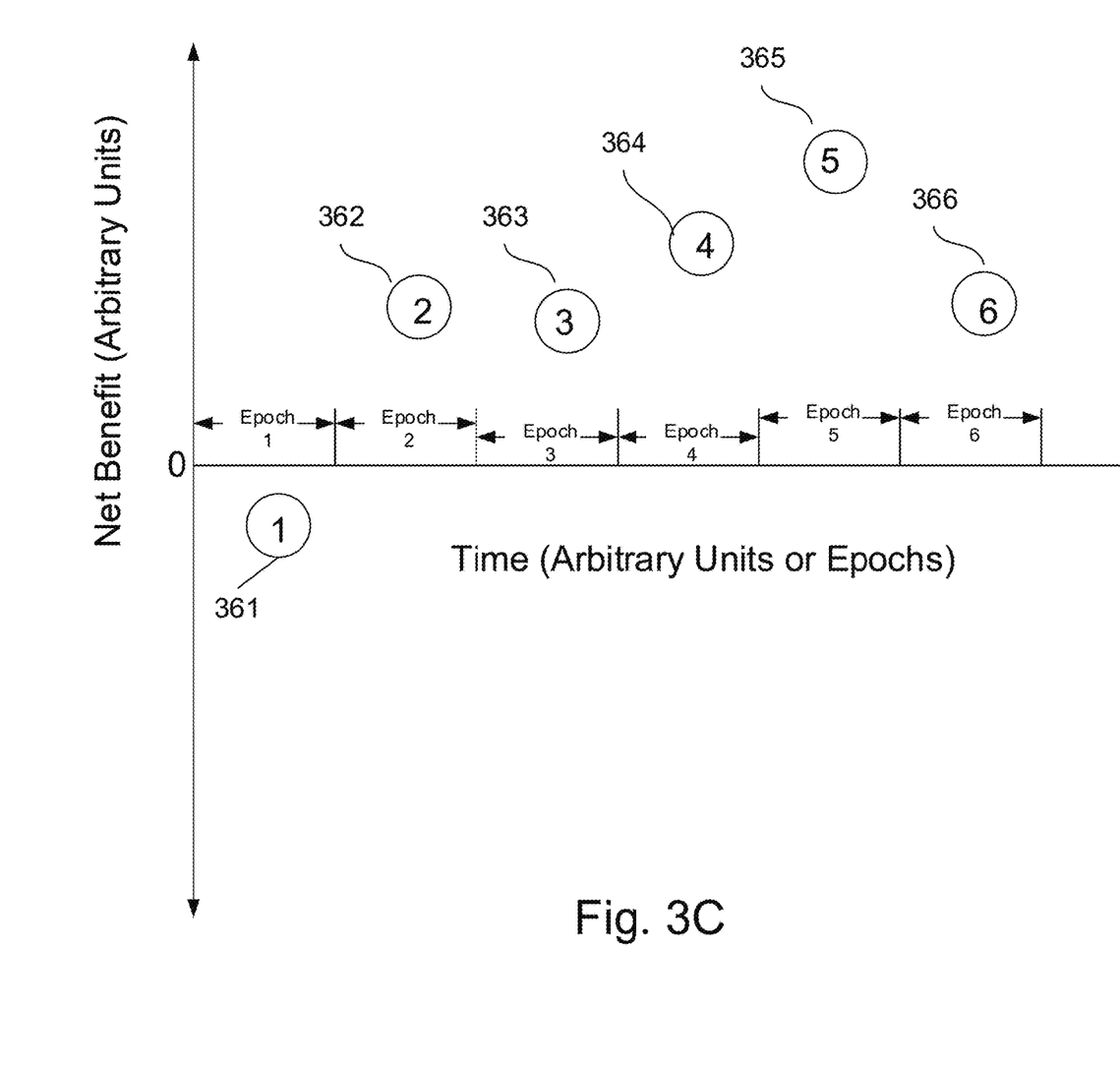

FIG. 3C illustrates another representation of epochs at which garbage collection can be performed, graph 360. In graph 360, epochs 1-6 are illustrated. Graph 360 also illustrates values 361-366, representing a net benefit of performing a garbage collection, corresponding to epochs 1-6. The epochs represented in FIG. 3C are ranges of time as compared to points in time as described in FIGS. 3A-3B. In some examples, these epochs can be of non-uniform time. In some examples, the epochs can have non-epoch time between them.

Figure 4:
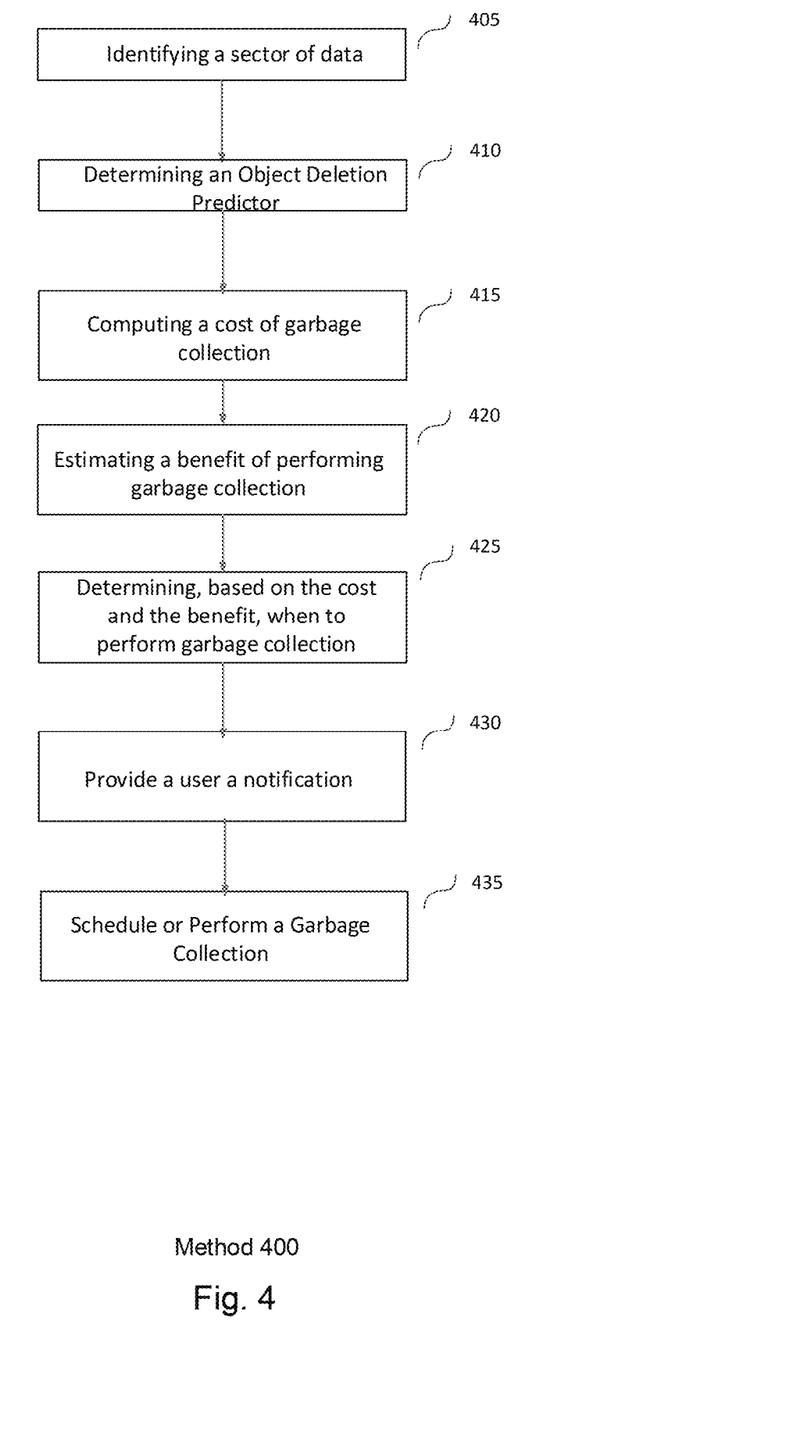
FIG. 4 is a flowchart of an example method according to aspects of this disclosure.

FIG. 4 illustrates a flowchart of an example method 400 of using a predictor that estimates a likelihood that an object will be deleted during a next epoch or if a container should be marked for garbage collection in a next epoch. As described in this disclosure, through the use of predictive information about files or containers, it can be predicted, based on historical records or other information that a particular file within a container will likely be deleted or become garbage at some specific time in the future. This information is useful in determining the most efficient garbage collection schedule as described below.

At block 405, a container of data can be identified. The container of data can be a sector of data made of one or more discrete objects, such as containers 220-240. The container can be chosen or identified based on a pre-determined schedule. In other examples, a container can be chosen based on a container being close to occupying a physical area in which it is stored, such as a SMR disk layer or a flash block. As each container of data has a countably finite number of discrete files or objects, the number of files can be counted or extracted from metadata, such as metadata 225.

At block 410, a deletion predictor or a lifetime predictor can be generated for each object or file in the container of data. In some examples, a deletion predictor or lifetime predictor can be generated for the selected container as a whole or for a subset of files within the container. In other examples, more than one predictor can be combined for additional or more robust predictions. A deletion predictor can be a probability or other quantitative metric representing a probability that an object will be deleted. The deletion predictor can be a single numeric value corresponding to the probability an object, group of objects, or a portion of a container will be deleted in a next epoch. The deletion predictor can also generate probabilities that a particular object will be deleted for each epoch of a fixed number of upcoming epochs. For example, the deletion predictor can be generated for each object for the next 5 epochs. In this way, for each object, a vector can be generated. For example, for file 221, a vector can be generated such as 1.1, 0.13, 0.24, 0.20, 0.31, where each number represents the probability that the file will be deleted in a particular epoch. In this example, 0.1 can be the probability that the file will be deleted in the next epoch, 0.13 in the second epoch from the current time, 0.24 in the third epoch from the current time, and so on. Similarly, in a container containing "n" files, n-vectors of a predetermined length can be generated. A probability matrix can be generated for the container in this manner, where each row represents a particular file, and each column represents a particular epoch. For example, a sample matrix for 3 objects and 3 epochs may look like:

[0.13 .2 .11 .16 .26 .29 .81 .9 .94]

Although reference is made to vectors and matrices in this disclosure, it can be understood that equivalent mathematical techniques and representations exist for these probabilities. In addition, other cost or benefit matrices can be estimated or generated. Through matrix operations, the probability matrices can be multiplied with cost or benefit matrices to generate a matrix of expected costs or benefits.

Further, although examples are given above with reference to generating a deletion predict or a lifetime predictor for specific objects, a deletion predictor or a lifetime predictor can also be generated for a group of objects which are a subset of the objects of the container. A deletion predictor or a lifetime predictor can be generated for a container as a whole which can indicate, for example, a prediction that a certain percentage of the objects or percentage of bytes of information in the container are likely to be deleted by a certain time or epoch. In some examples, deletion predictions or lifetime predictions made for specific objects or groups of objects can be aggregated into a prediction for a container. In other examples, deletion predictors can be generated for a chosen subset of objects within a container and aggregated.

With reference to block 410, various techniques can be employed to generate a deletion predictor or matrix of deletion predictors. In some examples, Bayesian inference techniques can be used to generate an objection deletion predictor. Objects or files can be classified based on basic features such as the owner, the program that created the file, the data type—such as a photo, music, or specific file format, the object's age, recent access rates or times. After a class is created, for each class of objects, one can compute the survival function based on deletion rates of objects in the class. By Bayesian inference an object's deletion probability within the next "n" epochs can be computed based on the survival function for the object class, the prior information, and the object's current age. The object's current age is a type of updated information which can be used to continuously update the prediction. In addition to the techniques above, additional metadata can be incorporated into the estimation techniques. For example, information about where the data is stored, the type of data historically included, prior predictions and their accuracy in connection with other data which has similar or matching metadata to the file currently being analyzed, can all be included.

In other examples, machine learning (ML) classification algorithms can be used. Whether or not the object will be deleted in the next epoch can be considered as a binary classification question. Additionally, a non-binary classifier can be used to predict the likelihood that an object will survive the next "n" epochs, such as the next 2, 3, 4, etc. epochs. Whether or not an object will be deleted in the next "n" epochs can be represented as a set or a binary string, such as the string <0,0,1,1,1>, where the location represents a specific epoch, and a 1 or a 0 whether or not the object will be deleted. In other examples, whether an object will be deleted within the next "n" epochs can yield a 0 or a 1. For a particular container, the algorithm may yield a 0 for the first three epochs but yield a 1 at the $4^{th}$ epoch. One example ML algorithm which can be used is the "Random Forests" technique, which is a well-defined algorithm for this classification problem. In addition, other ML techniques, such as Simple Neural Networks can be used in classification or predicting lifetimes of objects. A matrix of 0s and 1s can be generated for the container where each row represents a particular file, and each column represents a particular epoch. For example, a sample matrix for 3 objects and 3 epochs may look like:

[0 1 0 1 1 1 0 0 1]

In some other examples, ML regression algorithms can be used to predict the absolute lifetime of an object rather than a prediction relative to an epoch. A time value can be generated which represents when an object should ideally be deleted or becomes garbage. This can correspond to the last time an object would be used for example. In some examples, neural networks can be used to predict or generate a deletion predictor. A neural network can be designed using a single output neuron. The single output neuron can be used to solve a particular regression problem, the solution of which can be used to generate an object lifetime prediction. Neutral networks are robust and can be used where models may not perfectly fit the data available, particularly when data being fitted or regressed changes over time. Neural networks can provide a higher degree of prediction accuracy with relatively less modeling effort. The advantage of these regression techniques is that they allow for absolute lifetimes to be predicted—which in turn enable the use of non-constant or variable epoch lengths. This is as the lifetime of an object or file is not measured in the number of epochs but as a length of time. In this way, a variable epoch can be used when a ML regression algorithm is used.

At block 415, a cost of garbage collection for the container of data can be calculated or estimated. The cost of garbage collection for the container of data can be calculated for the data collection being performed at the next epoch or a later epoch. The cost of garbage collection can be based on the object deletion prediction formed in block 410. As the deletion predictor indicates which files are likely to be unwanted or garbage, that information can be used as part of a function or estimation of cost. For example, the cost of garbage collection can be related to how much and how fast object containers can be processed in garbage collection. The amount of garbage removed or the amount of space saved in a container by performing garbage collection is known as shrinkage. Shrinkage can also be understood to refer to the percentage or fraction of data which can be deleted or garbage collected. The predicted shrinkage of a selected container is a combination of the predicted shrinkages of the individual objects within the container, which in turn is a combination of the probability that an individual object will be deleted or not and the size of that object. The predicted shrinkage of a container can also be computed from the component predictions of the container as a whole which may have been used in the machine learning or other prediction algorithms discussed with reference to block 410.

In addition to the cost of garbage collection, additional costs are associated with maintaining data, such as storage costs per time. The cost of storage per a period of time is known or easily estimated in most systems. In addition, additional overhead, maintenance, and human operator costs can be included as part of the storage of the data costs. These costs, which can be time-dependent, fixed, or storage size dependent can all be included in the cost of conducting garbage collection at a later epoch.

In some examples, the cost of running a garbage collection on a container in the next epoch of garbage collection is the cost of the operation, which can be fixed or can depend on the amount of undeleted data or garbage in the container. The exact computational cost can depend on the system. For example, the exact cost of running a garbage collection in a particular epoch may require including at least the cost of reading the undeleted data in a container. In other examples, the cost may require reading the entire container and the cost of writing out to another portion of volatile memory data which is not to be deleted from the container.

In an example container with 100 items of a 256 MB size, it may be determined from the deletion predictor that 77 of them are likely to be garbage by the next epoch. A cost function can then be estimated from this data. The cost function may depend on the size of the container and the type of media that the container is stored in.

For example, the function may look like $$Cost_{Garbage\ Collection\ at\ Next\ Epoch}(\text{Container}) = \\ \Sigma_{i=1}^{77} P(\text{File } i) * \text{Size}(\text{File } i) + (\text{Time to Epoch}) * 256 * \frac{\text{cost}}{mb * \text{time}}$$

In some examples, the cost function can be represented by or include two functions. For example, a function s(x) can represent the cost of storing an amount of data 'x' for one epoch or for one unit of time. S(x) can be a monotonic function. S(x) can increase as x increases. Another function can be GC(x,y), which is the cost of garbage collection for a container of size or with data 'x' that has an amount of garbage 'y'. As the amount of garbage cannot exceed the size of the container, y<x. The variables x and y can also be donated with subscripts, such as $x_o$ or $y_o$ where o indicates that the value x or y is for a particular time or epoch. For example, $x_2$ can indicate the amount of data 2 epochs from a current epoch while $y_2$ can indicate the amount of garbage in 2 epochs from a current epoch. In n epochs $x_n$ and $y_n$ will indicate the size or amount of data within a container and the amount of garbage in that container. When a value is predicted rather than known, it can be notated with a '—such as in $y'_n$. The actual garbage in N epochs from the current epoch can be denoted by $y_n$. while the predicted value can be denoted by $y'_n$. The functions GC(x,y) and S(x) can be any functions which model, estimate, calculate, or generate the costs of garbage collection and storage respectively.

For example, the cost of running garbage collection at the current epoch and then running the garbage collection N epochs from now can be represented or calculated as: $GC(x_o,y_o)+N\ s(x_o-y_o)+GC((x_o-y_o),(y'_n-y_o))$. If garbage collection is not run now and run at N epochs from now, the cost can be represented or calculated as: $N\ S(x_o)+GC(x_o, y'_n)$.

In addition to computing the cost using a function, it is also possible to generate a cost using predictive machine learning or generative algorithms, where the deletion predictor is an explicit or hidden variable of the algorithm. In other examples, it is possible to have a cost matrix, which is multiplied by the matrices discussed with reference to block 410, and generate predicted cost matrices through matrix multiplication.

At block 420, a benefit for running a garbage collector on the selected container can be calculated. The benefit of running a garbage collection on a container is the amount of storage space freed up by removing unneeded files, reducing the overhead of maintaining metadata and tracking deleted files, reduction in the fragmentation of the container, and in some storage systems, such as SMR memory, the availability of new "append only" space to append new files in. The benefit for running a garbage collection is typically linear or very close to linear in the amount of data that is to be deleted, such as the size of the reads for the garbage collector or the number of bytes of information saved by performing garbage collection. Yet, in certain types of data, such as highly unorganized, random, or fragmented data, the benefit of running garbage collection can be non-linear. In some examples, where computational resources are limited and more garbage exists in one or more containers than can be processed by the available computational resources, a schedule or sequence of garbage collection can be created to optimize running garbage collection for the containers based upon which container has the largest benefit from running a garbage collection. In certain subsets of the aforementioned example, the costs can tend to go to infinity as enough computational resources are not available to perform garbage collection and thus the most beneficial containers may be selected for garbage collection. In some examples, the benefit of running a garbage collection can be also premised on machine learning techniques which use metadata, variables, or metrics uncovered in earlier blocks or through analysis or earlier estimates of expected benefits of running a garbage collection and observed benefits.

Similar to the example given with reference to block 415, an example container with 100 items of a 256 MB size, it may be determined from the deletion predictor that 77 of them are likely to be garbage by the next epoch. A benefit function can be computed as, for example:

$$\text{Benefit}_{\text{Garbage Collection at specific Epoch}}(\text{Container}) = \text{Cost Per MB} * \Sigma_{i=1}^{77} P(\text{File } i) * \text{Size (File } i)$$

In addition to computing the benefit using a function, it is also possible to generate a benefit using predictive machine learning or generative algorithms, where the deletion predictor is an explicit or hidden variable of the algorithm.

In some examples, the benefits of running a garbage collection can be estimated, calculated, or generated for both the next epoch, and a series of upcoming epochs. For example, the benefit of running the garbage collection at the next epoch compared to a future epoch can be calculated. In other examples, a benefit can be generated for any arbitrary time in the future. For example, the benefit can be generated for a time chosen based on the most probable time that the most number of items first become "garbage" in block 310. Other techniques to optimize or reduce the computational cost of calculating all upcoming epochs can also be used to make the processes in block 320 more efficient.

At block 425, a time can be determined at which to collect garbage based on the computed or estimated costs and benefits as described in blocks 405-420 above—such as for example, the costs and benefits for the upcoming or next epoch and at least one later epoch. A net benefit can be calculated as the difference between the estimated benefit from performing a garbage collection at a specific epoch and the estimated cost from performing a garbage collection at that same epoch. In some examples, when the net benefit is positive, garbage collection can be performed on that container. In some examples, when the estimated benefits of performing garbage collection are higher than the estimated costs by a pre-determined value, garbage collection can occur. Since there is a probability known or calculated for each object within a container as to whether that object will survive or be deleted in the upcoming epoch, this information can be included to calculate the expected size of the undeleted data and the probability that the entire container will be garbage.

In some examples, the expected benefit or net benefit between performing garbage collection now and performing garbage collection at N epochs from now can be represented by or calculated using: $GC(x_o,y_o)+N\ s(x_o-y_o)+GC((x_o-y_o), y'_n-y_o)-Ns(x_o)-GC(x_o, y'_n)$. In this manner, by varying for a series of expected benefits or net benefits can be generated for the container and used to determine when garbage collection should occur.

In some examples, net benefit values of waiting for an additional epoch can also be calculated to see if the difference in the net benefit of waiting is greater than the net cost of waiting for a next epoch. The costs and benefits associated with garbage collection can be determined for the next epoch, and then for a one or more epochs after that next or upcoming epoch. For example, the following table indicates the net benefit of performing a garbage collection at a series of epochs, and shows that epoch 3 is where the greatest net benefit is expected.

| Epoch | 1 | 2 | 3 | 4 |
| --- | --- | --- | --- | --- |
| Average Deletion Predictor Value | .34 | .44 | .55 | .58 |
| Cost at Epoch | .43 | .44 | .47 | .53 |
| Benefit | .13 | .50 | .60 | .61 |
| Net Benefit | −.30 | .06 | .13 | .09 |

In this manner, data within a collection and the costs of maintaining the data in the collection can be dynamically managed in real time. In other examples, a time-series analysis can be performed on the net benefit to calculate an optimal epoch in which to perform a garbage collection.

In other examples, garbage collection can be performed at an unscheduled epoch when it is determined that the estimated benefit exceeds the additional cost of performing garbage collection at an unscheduled epoch. Performing garbage collection at an unscheduled epoch can be automated or be performed responsive to receiving approval from a user or administrator of the data.

At block 430, a notification can be provided to a user. The notification can include information related to the scheduling of and the net benefits of performing a garbage collection. The notification can be sent from a computing device such as computing device 100 over a communication interface, such as communication interface 196. In some examples, the notification can include a schedule of garbage collection for a particular container. In other examples, a computing device can aggregate predicted metrics and/or garbage collection schedules for one or more containers. The computing device can display this information to a user through a display, such as display 195. Example notifications can be referenced in FIG. 6 below.

At block 435, a garbage collection can be scheduled or performed. In some examples, a garbage collection can be scheduled based on the processes of one or more of block(s) 405-430. In some examples, garbage collection can be scheduled at the earliest epoch from the pre-determined number of next epochs where the net benefit is above a pre-determined threshold. In other examples, garbage collection can be performed at the epoch where the net benefit is maximum. In other examples, a garbage collection can at a time offset to a time which corresponds to an epoch. The process of garbage collection can involve reading the contents of a container, a garbage collector marking files which are to be deleted, and selectively copying files to a new container which are not marked, and deleting the remainder of the container. In some examples, historical meta-data related to a container or objects or predictions associated with the container or the objects can be stored in a database outside of the container.

In some examples, additional information can be included in the net costs and benefits described above. For example, in certain types of memory, it is possible to append to a container but not re-arrange or modify information already existing in the container without reading, writing, or modifying the entire container. In some examples, if it is known or expected that additional objects or files will be appended to an existing container between epochs, that information can be included in the techniques described with reference to FIG. 3.

In some examples, the deletion predictor, and costs and benefits which are related to the predictor, can also include a margin of error of the prediction. For example, including a margin of error prediction can occur in ML classification examples discussed above. The error can also be included in the decision on whether to schedule or conduct garbage collection. In other examples, only garbage collections where the margin of error of the deletion predictor or lifetime predictor is small or lower than a pre-determined confidence interval can be scheduled or performed.

In some examples, additional techniques can be used in conjunction with or in lieu of the techniques described above. For example, costs and benefits can be estimated or generated using other artificial intelligence or machine learning techniques. In some examples, a continuous or discrete time series can be generated for both the cost of maintaining a container and performing a garbage collection and the benefit of conducting a garbage collection. In other examples, a net benefit time series is generated using machine learning techniques based on the lifetime predictor or deletion to avoid having to generate a benefit and cost for each point of the time series. In other examples, the time series can be continuously updated as time moves forward. For example, a time series can be updated with more current information daily. In other examples, the time series can be updated at pre-determined time intervals, such as close to or right before a time corresponding to an epoch.

In some examples, the operations described above can be repeated automatically upon the time reaching an epoch. In such examples, the schedule of garbage deletions will always be current and updated based on new probabilities, costs, benefits, and data after a fixed period of time or a user input. In some examples, close to an upcoming epoch, the timing or schedule of when to perform garbage collection can be updated with more current information. In other examples, trigger events can cause the operations or predictions described above to be repeated. For example, when garbage collection is performed responsive to a user request, the processes of block(s) 305-330 can be repeated. In yet other examples, when data stored in one or more containers increases beyond a pre-determined threshold, the processes described in block(s) 405-430 can be repeated. Other trigger events can be defined by a user or designer of the garbage collector system.

Figure 5:
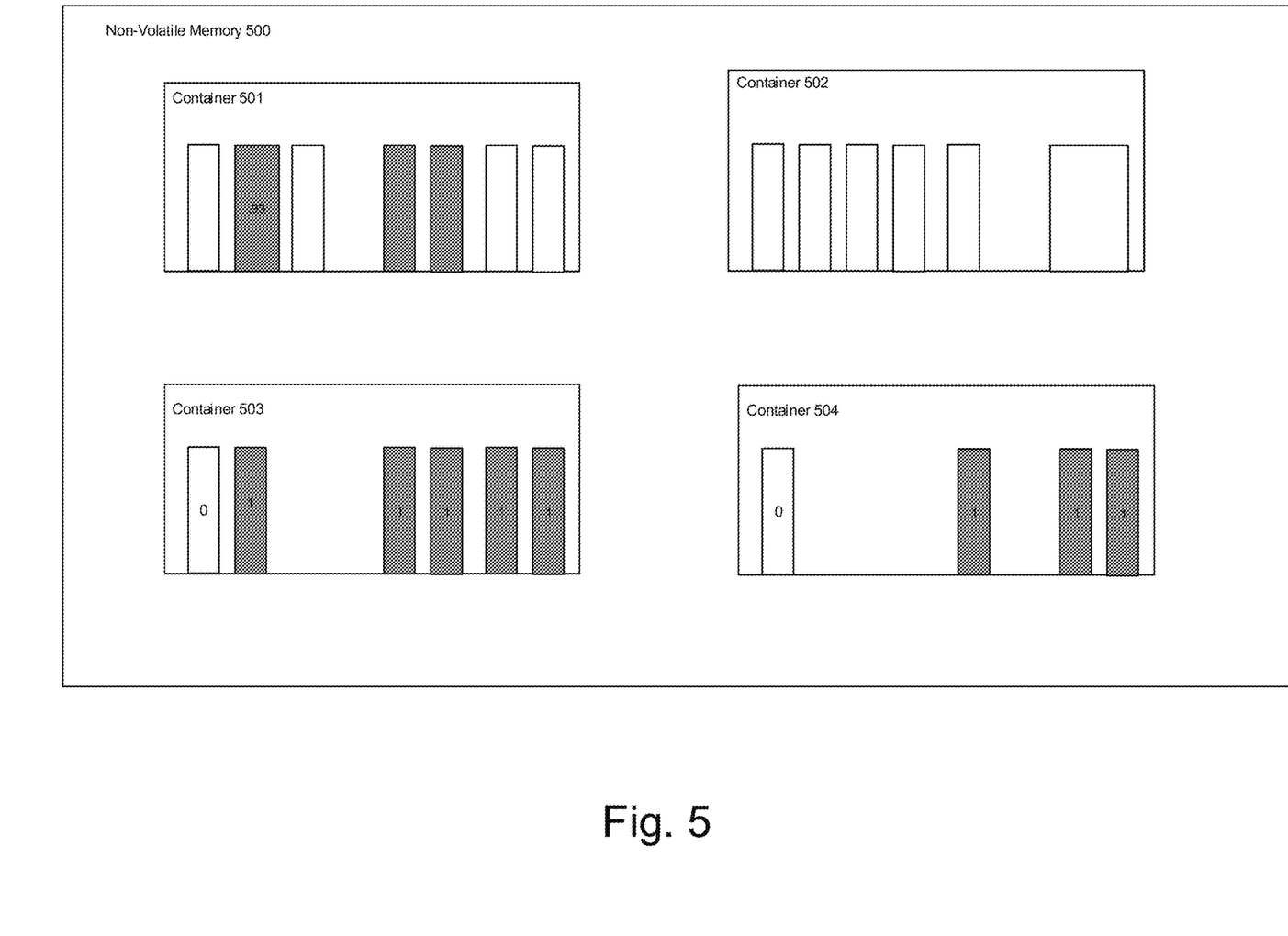
FIG. 5 is a diagram of an example storage medium according to aspects of this disclosure.

FIG. 5 illustrates a diagram of various containers, containers 501-504 in a non-volatile memory 500, each containing files or objects, some of which are garbage. Each file within a container is represented by a rectangle. In some containers, such as container 501, some rectangles have been shaded to indicate that the deletion predictor associated with that file is high and that the particular object is likely to be deleted in the next epoch. In some examples, a file can also have a numerical value associated with it to indicate how likely it is that the file will be deleted in the next epoch, such as when using a ML regression technique described above. In some examples, each file in a container, such as container 503, can also include a binary value to indicate whether it is expected to be garbage or not by the next epoch. In other examples, such as container 502, no analysis may have yet been performed, or the container recently been garbage collected, and no or little information may be available about that container.

Figure 6:
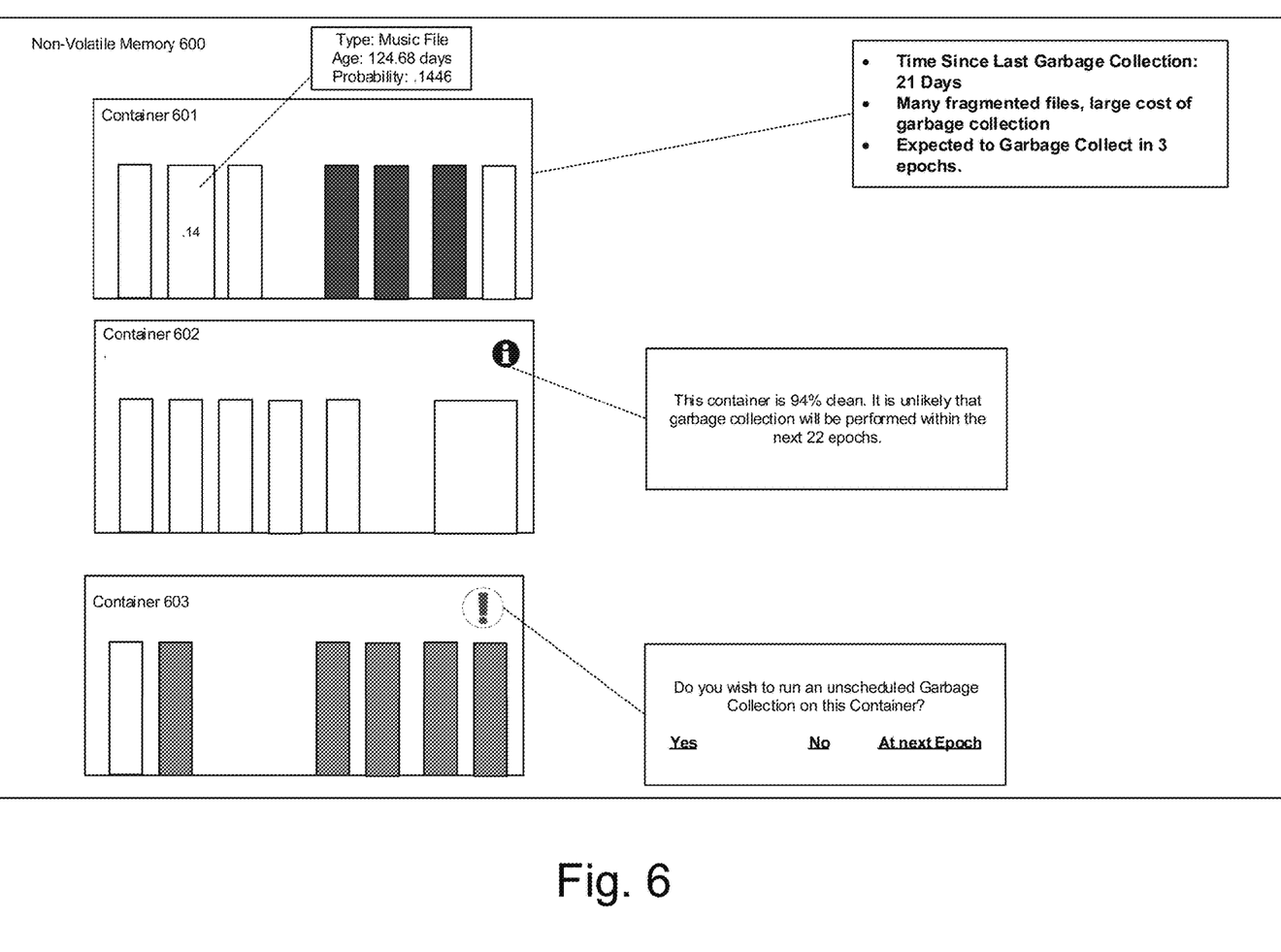
FIG. 6 is a diagram of an example communication interface displaying information about a container according to aspects of this disclosure.

FIG. 6 illustrates various containers, containers 601-603 of a non-volatile memory 600, and information related to those containers. This information can be displayed on for example, a display 195 of a user device 100 (FIG. 1). In some examples, information about each individual file, object, or cluster of objects can be displayed. For example, information about a particular file in container 601 is displayed on the file as a probability while an additional box indicates additional information about the file such as its type, its age, and its probability of undergoing garbage collection. Additional information about the container as a whole can also be displayed. On container 602 for example, an icon, such as an informational 'i' can indicate a notification for a user to click or however on. This notification can be received in response to an event about the container occurring or to just display general information about the container based on the predictive techniques described above. On container 603 a notification '!' is displayed to indicate an important event occurring in connection with container 603. A user could click on or hover over the notification to receive additional options regarding the notification. In an example, the notification could be a request to the user as to whether or not he wishes to perform an unscheduled garbage collection to which the user, through a user interface, can provide an input. Garbage collection can be responsive to the received input. It should be understood that the foregoing is merely an example interface, and that numerous variations in the interface are possible.

While this disclosure contains many specific implementation details, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

The invention claimed is:

1. A method of determining whether to perform a garbage collection operation comprising:
   identifying a container, wherein the container comprises one or more discrete objects;
   determining a deletion predictor related to the container at a first epoch;
   computing a cost of garbage collection for the container at the first epoch;
   estimating a benefit of performing garbage collection for the container at the first epoch, the benefit comprising an amount of freed storage, a reduction in overhead of maintaining metadata and tracking deleted files, and a reduction in fragmentation of the container;
   determining a net benefit of performing garbage collection for the container at the first epoch based on the computed cost and the estimated benefit.

2. The method of claim 1, wherein determining the deletion predictor comprises performing a machine learning classification algorithm to generate a binary deletion predictor.

3. The method of claim 1, wherein determining the deletion predictor comprises performing a machine learning regression algorithm to generate a probability.

4. The method of claim 3, wherein the machine learning regression algorithm is a neural network.

5. The method of claim 1, comprising generating a user notification regarding the garbage collection.

6. The method of claim 5, wherein the user notification includes a request for a user to approve a garbage collection.

7. The method of claim 5, wherein the user notification includes information related to a schedule of garbage collection.

8. The method of claim 5, wherein the user notification includes information indicating the expected benefit of the garbage collection.

9. The method of claim 1, comprising scheduling a garbage collection at the first epoch when the net benefit is positive.

10. The method of claim 9, comprising determining the deletion predictor related to the container for a pre-determined number of epochs following the first epoch.

11. The method of claim 10, comprising generating a net benefit for the container at each epoch of the pre-determined number of epochs following the first epoch.

12. The method of claim 11, comprising:
    identifying the epoch at which the net benefit is the greatest; and
    scheduling a garbage collection at the epoch at which the net benefit is the greatest.

13. The method of claim 11, comprising scheduling a garbage collection at the earliest epoch from the pre-determined number of next epochs where the net benefit is above a pre-determined threshold.

14. The method of claim 11, comprising generating an additional net benefit for an additional epoch when within a pre-determined range of the earliest epoch following the first epoch.

15. The method of claim 11, comprising re-evaluating a metric related to the identified container upon the occurrence of a trigger event.

16. The method of claim 15, wherein the trigger event is a user command to perform a garbage collection on the identified container.

17. The method of claim 11, comprising re-evaluating a metric related to the identified container at the start of any epoch after the first epoch.

18. A system configured to schedule garbage collection, the system comprising:
    one or more non-volatile storage medium wherein each non-volatile storage medium contains one or more containers of data, each sector comprising one or more discrete objects;
    a non-transitory computer readable storage medium containing instructions, the instructions when executed configured to perform the steps of:
    identifying a container;
    determining a deletion predictor related to the container at a first epoch;
    computing a cost of garbage collection for the container at the first epoch;
    estimating a benefit of performing garbage collection for the container at the first epoch based on at least the determined deletion predictor, the benefit comprising an amount of freed storage, a reduction in overhead of maintaining metadata and tracking deleted files, and a reduction in fragmentation of the container;
    determining a net benefit of performing garbage collection for the container at the first epoch based on the computed cost and the estimated benefit.

19. The system of claim 18 comprising the instructions configured to generate a notification for a user.

20. A non-transitory computer readable storage medium containing instructions, the instructions when executed configured to perform the steps of:
- identifying a container;
- determining a deletion predictor related to the container at a first epoch;
- computing a cost of garbage collection for the container at the first epoch;
- estimating a benefit of performing garbage collection for the container at the first epoch based on at least the determined deletion predictor related to the container, the benefit comprising an amount of freed storage, a reduction in overhead of maintaining metadata and tracking deleted files, and a reduction in fragmentation of the container; and
- determining a net benefit of performing garbage collection for the container at the first epoch based on the computed cost and the estimated benefit.

* * * * *